Oct. 11, 1938.     C. D. SMITH     2,132,545
MOTOR VEHICLE CONSTRUCTION
Filed March 25, 1935     2 Sheets-Sheet 1
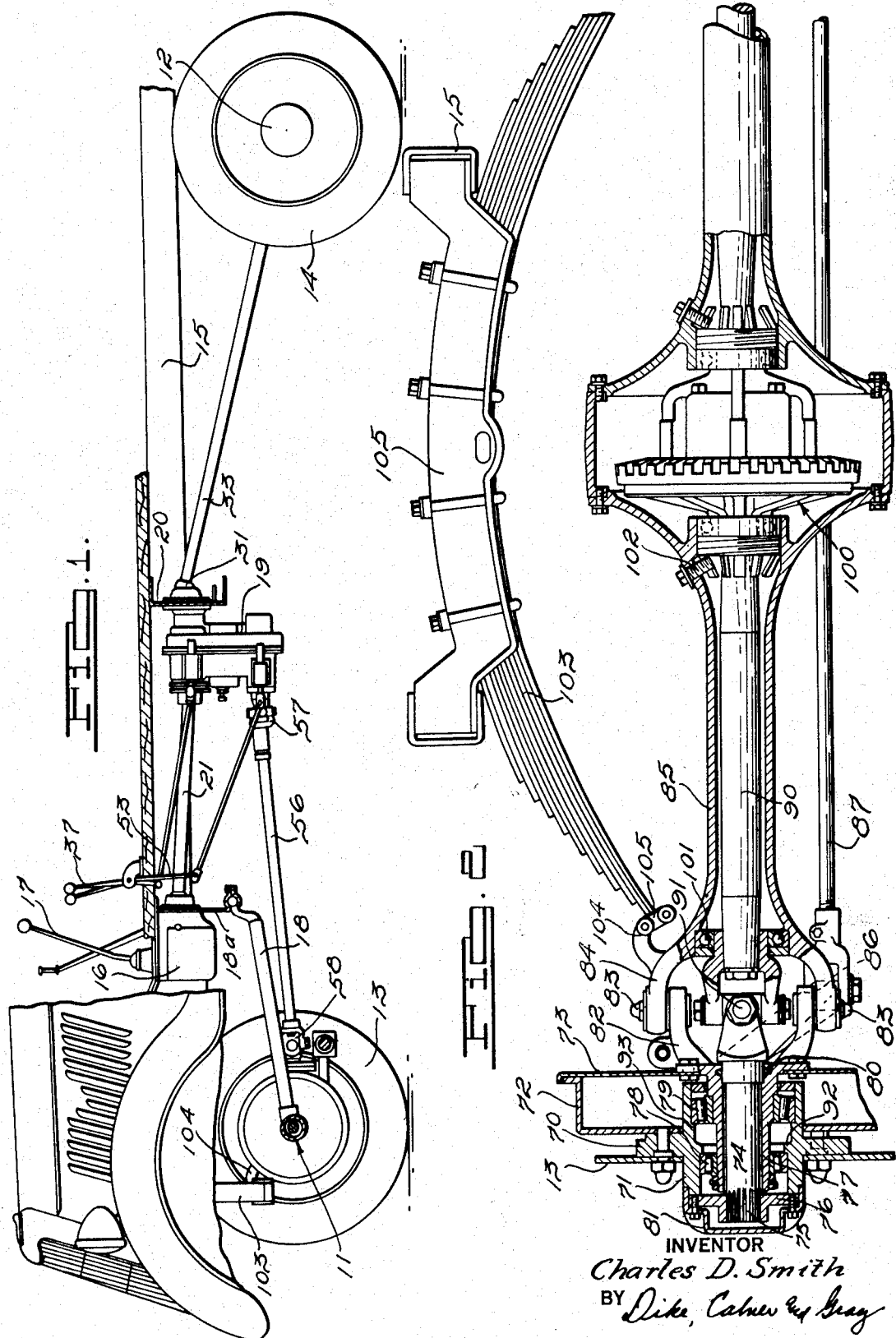
INVENTOR
*Charles D. Smith*
BY *Dike, Calver and Gray*
ATTORNEYS

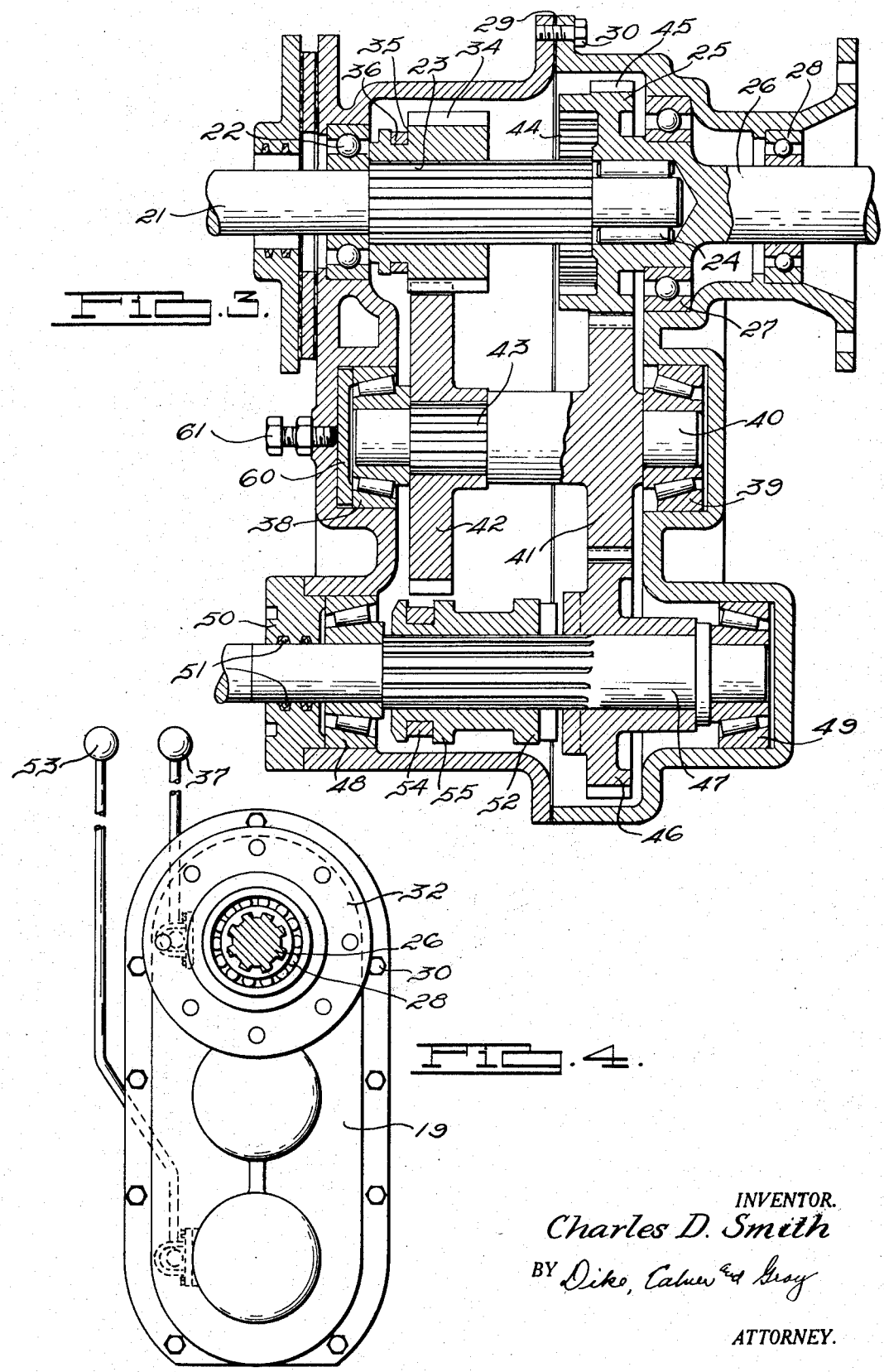

Patented Oct. 11, 1938

2,132,545

UNITED STATES PATENT OFFICE 2,132,545

MOTOR VEHICLE CONSTRUCTION

Charles D. Smith, Alma, Mich., assignor, by mesne assignments, to Alma Motor Company, St. Louis, Mich., a corporation of Michigan Application March 25, 1935, Serial No. 12,848

5 Claims. (Cl. 180—43)

The present invention relates to motor vehicle construction, particularly though not exclusively adapted for the construction of motor vehicles in which the forward steering wheels are also power driven. Such vehicles may be of the so-called "front wheel drive" type in which the front wheels only are power driven and provide the tractive effort by which the vehicle is moved. Such vehicles also may be of the so-called "four wheel drive" type in which the front wheels and the rear wheels all are power driven and cooperate to furnish the tractive effort required to move the vehicle. Such "four wheel drive" vehicles are of several known types, as for example those in which all of the driving wheels are driven from a central power source by separate shafts running to each of the wheels; those in which the front and rear axles are driven respectively by forwardly and rearwardly extending drive shafts; and those in which the front driving wheels may be selectively power driven as more particularly described in a copending application for United States Letters Patent for "Vehicle driving mechanism" filed by applicant and Frank W. Ruggles.

The present invention possesses utility in connection with each of the beforementioned types of vehicles and may be used either with vehicles for the so-called "front wheel drive" or any of the types of vehicles of the so-called "four wheel drive", some of which have been previously mentioned solely by way of example. The references herein to vehicles of these two classes are to be understood solely as being for purposes of example and not by way of limitation.

The present invention also may be used in any vehicle construction where an articulated movement of a power driven wheel relative to the driving connection with the wheel may be desired. The foregoing examples are exemplary of the fields in which the present invention possesses utility but in addition thereto it is to be understood that any articulated driving wheel such as an articulated power driven rear wheel is within the scope of the present invention.

I have discovered that the rigid connection of an articulated driving wheel to a power driven shaft results in the transmission of severe thrusts causing excessive wear in the connecting means, such for example as universal joints which may be employed to drive the shaft connected with the articulated wheel from an axle drive shaft. Prior to the present invention attempts had beeen made to construct mechanisms for the driving of articulated driving wheels in which such thrusts were carried into the axle mechanism and were absorbed by an angular movement of the axle driving shaft and by wear in the universal joint used to connect the axle driving shaft and the stub shaft used for driving the articulated wheel. Such constructions were not satisfactory because of the excessive noise and wear attendant upon the operation of the mechanism and also because of power losses which necessarily resulted from such construction.

It is, therefore, an object of the present invention to provide a motor vehicle construction in which an articulated power driven wheel is mounted on a driving shaft in such a manner that a limited sliding movement of the wheel relative to the shaft is permitted to absorb thrusts attendant upon the transmission of power to the articulated power driven wheel.

A further object of the invention is to provide a motor vehicle in which articulated driving wheels are connected with a swinging driving shaft which is driven from a fixed rotating drive shaft through suitable universal joint connections and in which the center of pivotal movement in the universal joint is substantially coincident with the point of swinging movement of the articulated driving wheels.

Another object of the invention is to provide a motor vehicle construction in which the articulated driven wheels may be selectively connected and disconnected from the power driving means, thus permitting the vehicle to be operated either as a four wheel drive or a two wheel drive vehicle, and as a two wheel power driven vehicle to have the power driven wheels either in the front or the rear of the vehicle.

It is a further object to provide a motor vehicle construction in which the driving mechanism normally used to drive the rear drive axle is connected with auxiliary means which in turn are connected to a power driven front axle which may be selectively engaged or disengaged from the power driven auxiliary means so as to operate the vehicle either as a four wheel drive vehicle or as a two wheel drive vehicle.

A further object of the invention is to provide a motor vehicle construction in which a simple and comparatively inexpensive unit is provided in the form of a power driven front axle and a power take-off member which may be attached to a motor vehicle of conventional design and convert such vehicle into a selective four wheel drive vehicle.

Other objects of this invention will appear in the following description and appended claims, reference being had to the accompanying drawings forming a part of this specification wherein like reference characters designate corresponding parts in the several views, Fig. 1 is a fragmentary view in side elevation, partially in section, of a motor vehicle construction embodying the present invention.

Fig. 2 is a fragmentary view, partially in section, showing the power driven axle and articulated power driven wheel assembly. In this embodiment the assembly is shown as the front axle assembly of the motor vehicle shown in Fig. 1.

Fig. 3 is a sectional side elevation of the gear box and the drive transfer box shown as being mounted on the motor vehicle shown in Fig. 1.

Fig. 4 is an end view in reduced size of the gear box shown in Fig. 3.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring to Fig. 1, there is shown a conventional motor vehicle equipped with a front power driven axle 11 and a rear power driven axle 12, upon which are mounted the front and rear ground-engaging wheels 13 and 14 respectively. A fabricated frame 15 is supported on springs mounted on the axles according to conventional construction. The motor vehicle is provided with a transmission mechanism 16 which is operatively connected in conventional manner with the engine (not shown). The transmission 16 is provided with a gear shift lever 17 for selectively shifting the gears contained therein to secure desired speeds therefrom. In the construction herein shown, the frame is supported on transverse leaf springs which extend on lines substantially parallel to the axles. It is to be understood, however, that the longitudinal leaf type of spring may be used in accordance with conventional practice in the construction of such vehicles. Where the transverse spring construction is used, a front supporting frame or wishbone member 18 is provided which connects with the bracket 18a secured to the frame of the vehicle at a point directly adjacent the transmission mechanism.

A transfer gear case 19 is secured to a transversely disposed cross member 20 which forms a part of the vehicle frame. The main drive shaft 21 extends from the transmission 16 into the transfer gear case 19 and is journaled in a bearing 22 (Fig. 3) provided therein, the shaft 21 being splined as shown at 23, and for a purpose to be presently described the extreme end of the shaft is reduced in size and is journaled in a bearing 24 which is mounted in a gear 25, said gear being provided on the end of the drive shaft section 26 which leads to the rear axle, the hub of the gear 25 being journaled in bearings 27, and a bearing 28 which is mounted in the transfer gear case 19.

The transfer gear case 19 is preferably formed in two sections, being split on the line 29 and secured together by means of bolts or similar securing means 30 in accordance with preferred conventional design. In the arrangement of parts here shown, the gear box is placed at an angle of greater than 90° to the shaft 21. Where such an arrangement of parts is used, the shaft 21 is preferably connected by a universal joint on each end with the driving and driven shafts. If but one universal joint is to be used with said shaft, the gear box must be mounted on a line extending at right angles to said shaft.

A universal joint housing 31 (Fig. 1) is secured to the flange 32 (Fig. 4) of the housing and a torque tube 33 encloses a drive shaft which leads to the rear axle differential in the usual manner.

The transfer gear box 19 contains a creeper gear 34 (Fig. 3) which is slidably mounted on the splined shaft section 23, the hub of said gear being grooved as at 35 to accommodate a collar 36 to which a shifting lever 37 (Fig. 1) is connected in a conventional manner. Bearings 38 and 39 respectively are mounted in the transfer gear case 19 and an intermediate shaft 40 is journaled therein, a gear 41 being formed integral with the shaft and a gear 42 being mounted on the splined section 43 of said shaft, said gear 42 meshing with and being driven by the creeper gear 34 when the said gear is shifted to a predetermined position for engagement therewith.

The gear 25 has both internal and external teeth, the internal teeth 44 meshing with the teeth of the creeper gear 34 when said gear is shifted into position for engagement therewith. The external teeth 45 of the gear 25 mesh with and drive the gear 41, said gear 41 in turn meshing with and driving the gear 46 which is mounted on the clutch shaft 47 which is in turn journaled in bearings 48 and 49 respectively provided in the transfer case 19. The front end of the clutch shaft is turned and an end plate 50 forms a closure for the opening in the case, oil rings 51 being provided to prevent the escape of lubricant from the interior of the case 19.

A dog clutch 52 is slidably mounted on the clutch shaft 47 and is shiftable into and out of engagement with the clutch shaped end of the gear 46, said clutch being shifted by means of a lever 53 (Fig. 1) which extends to a position directly adjacent the driver's seat, a collar 54 being mounted in the groove 55 so that the conventional shifting hook-up between the shift lever 53 and the clutch mechanism may be utilized.

A front axle propeller shaft 56 (Fig. 1) is operatively connected to the front axle differential and to the clutch shaft 47 in the transfer case (Fig. 3) so that the front axle may be positively driven by power passing through the transfer case 19. This construction is such that it will be noted that the front axle propeller shaft 56 is driven at the same speed as the rear axle propeller shaft 33 but may be engaged with or disengaged from the power driven transfer case by operation of the clutch 52.

Universal joints 57 and 58 are provided at the ends of the front axle propeller shaft 56 and provide the necessary flexibility for driving the front axle from the gear transfer case 19. The propeller shaft 56 which drives the front axle operates in substantially the same manner and at the same speeds as the rear axle propeller shaft.

A bearing adjusting plate 60 (Fig. 3) is provided on the end of the bearing 38 and an adjusting stud 61 is mounted in the end wall of the transfer case, said stud bearing against said plate to adjust and take up the bearing wear.

It will, of course, be obvious that the gears in the transfer case 19 are subject to all of the transmission speeds and that the ratios of the gears in the case provide for further reductions in speed beyond that afforded by the conventional transmission. The present design is such that a creeping speed of as low as approximately eighty-four to one can be provided if desired by the use of the creeper gear 34. The power application to both the front and rear axles is identical and is through the gears in the transfer case, the rear axle being driven at all times when the engine, clutch and transmission gears are engaged, while the front axle is driven selectively whenever the clutch 52 is engaged.

When the gears are in the position as shown in Fig. 3 of the drawings, the power application is through the gears 34, 42, 41 and 45 to the shaft 26 which drives the rear axle. This provides for one gear ratio beyond the transmission. In this driving relation of the gears it will be noted that the gear 41 meshes with and drives the gear 46 at the same time and at the same speed as the gear 25 is driven. The gear 46 being mounted on the clutch shaft 47, it will be observed that when the clutch 52 is shifted into engagement with the gear 46, the clutch shaft 47 will be driven at the same speed of rotation as the shaft 26, this speed being transmitted to the front axle propeller shaft 56.

Another gear ratio is provided by shifting the creeper gear 34 into engagement with the gear 44 which is mounted on the end of the main drive shaft. The gear 44 in turn drives the gear 46 through the gears 45 and 41 so that when the clutch 52 is in position for driving the clutch shaft 47, the clutch shaft 47 will be rotated at the same speed as the rear drive shaft 26.

Referring to Fig. 2, the articulated driving wheels 13 in the present instance are carried on the forward end of the vehicle and each wheel is secured to and carried by a flange 70 formed on a hub member 71. Also secured to the flange 70 is the brake drum 72 which is adjacent to the stationary plate 73 which carries the brake mechanism (not shown) of any conventional type which is provided with means for frictionally engaging the inside surface of the drum 72 to effect a braking action on the vehicle wheel.

A power driven stub axle 74 is connected by a splined slip connection 75 with the hub driving dog 76 which is secured to the hub 71 and transmits the driving torque from the axle 74 to the hub 71 and the attached driving wheel 13.

The axle 74 is journaled in and extends through the wheel spindle 77 which forms a housing for the axle 74. The spindle 77 is formed as a forging which is integral with the steering yoke 82. The hub 71 is mounted on bearings 78 and 79 carried on the outside surface of the spindle 77. This permits rotation of the hub 71 and the connected parts relative to the spindle 77. The inside of the hub member 71 is packed with a suitable lubricant and is sealed by the packing strip 80 and the cap 81.

The entire wheel and hub assembly is permitted to move in an arc about king pins 83 which pivotally connect the yoke 82 of the spindle 77, the connection being effected with the forked end 84 of the fixed axle housing 85. Movement of the wheel and hub assembly in an arc with the king pins 84 as the pivoting axis is initiated and controlled by the steering arm 86 (shown in dotted line) which is rigidly connected with a portion of the wheel carrying spindle 77 at one end and is pivotally connected with the conventional steering rod 87 at the other end, the steering rod 87 in turn being connected with and actuated by the conventional steering mechanism of any desired type (not shown).

The driving axle 74 is connected for rotation with an angular movement relative to the fixed driving axle 90 mounted in the axle housing 85. The connection is effected by means of a universal joint 91 which may be of any desired type to permit the required rotation of the driven axle 74 from the fixed axle 90 throughout the angular movement of the axle 74 relative thereto which is caused by the swinging movement of the wheel and hub assembly as above described. The universal joint 91 in the present construction is so mounted that the center pivot point is directly aligned with the king pins 83 which form the pivot points for the swinging of the wheel and hub assembly. The construction of wheel and hub assembly just described permits a slippage of the shaft 74 relative to the hub 71. Sliding movement of the hub 71 relative to the spindle 77 is prevented by a flange 92 on the inside of the hub 71 which contacts with a portion of the bearing 78 and by a flange 93 also on the inside of the hub 71 which contacts with a portion of the bearing 79. It will be noted, therefore, that while the wheel 13, the hub 71 and the spindle 77 are fixed against relative sliding movement, they are so constructed as to pivot as a unit on an arc described about the pivot pins 83, the radius of this arc being substantially coincident in length with the length of the spindle 77. During the swinging of the hub and spindle assembly the driving axle 74 is free for relative sliding movement in the splines of the driving dog 76 and thus may move longitudinally of the spindle 77 during the time that the axle 74 is rotating and driving the hub 71 and the wheel 13.

Considerable strains are imposed upon universal joints in similar types of construction which do not embody the present invention which permits slippage between the driving axle 74 and the driving dog 76. In such constructions it is conventional design to anchor the shaft 74 in the driving dog in such a manner as to prevent any relative sliding movement of the axle and dog. In this construction, when the spindle and hub assembly is swung through the above described arc, the shaft 74 also swings through an arc whose pivot point is the pivotal center of the universal joint 91. The radius on which the spindle and stub shaft swing have the same center when one of the axes of the universal joint coincides with the turning axis of the spindle on the pins 83 and in other radial positions of the universal joint the axis of the shaft 74 does not coincide with the axial line of the pins 83. This results in the creation of a thrust on the axle 74 which in turn is transmitted by the axle 74 to the universal joint or other part of the driving mechanism. Some attempts have been made to compensate for this force in fitting the counterpart of the power driven driving axle 90 loosely in the housing 85 in such a manner that it may move angularly therein. Some attempts also have been made to provide special thrust bearings in the universal joints to absorb these strains. In either instance, however, the results have not been fully satisfactory.

In the construction herein disclosed and set forth the axle 90 is driven from the power driven propeller shaft 56 through a conventional differential mechanism which is indicated generally at 100. The shaft 90 is anchored in the housing 85 for rotation therein in ball or roller bearings 101. The shaft 90 is, therefore, in the present embodiment essentially an anchored or fixed rotating shaft only and is not required to absorb thrust shocks transmitted thereto as above described.

In order to compensate for possible wear in the gears in the differential I provide an adjusting mechanism indicated generally at 102, which may be of any preferred type of construction.

In the foregoing description I have referred to the construction as being embodied in one wheel. It is understood, of course, that the construction is embodied in each wheel of the vehicle which is an articulated driving wheel. In the preferred construction as herein set forth, a cross yoke of the universal joint 91 is formed as an integral part of the stub shaft 74. However, it is within the purview of the present invention to provide a member for connecting the shaft 74 and the universal joint 91.

The invention, however, is not limited solely to articulated driving wheels but may also be found useful in connection with driving axles of the so-called "full floating" type wherein it frequently is desirable to provide for sliding movement between the ends of the axle drive shaft and the driving hub, although the wheel and hub in such instance are not strictly speaking an articulated wheel and an articulated hub. The invention, therefore, while being particularly disclosed herein as applied to articulated driving wheels, is intended to be used in any instance wherein it is desired to provide a slip connection between a driving axle and a wheel carrying, power driven hub.

The spring suspension shown in Fig. 2 is of the conventional transverse leaf spring type and comprises a leaf spring 103 which extends transversely of the vehicle and on a line substantially parallel to the axle. The spring is suspended at its free ends from spring hanger members 104 carried on the axle and swinging shackle connections 105 extending between the hanger members 104 and the ends of the spring 103. In this construction the vehicle frame 15 is provided with a transverse frame member 105 which is secured to the spring 103 in any desired manner. It is to be understood that the rear spring in the construction herein shown is of the same general type as that just described.

I claim:

1. A motor vehicle axle unit comprising a rigid housing adapted to be secured to the vehicle frame, a differential in the housing operatively connected with a source of power, rotating shafts journaled in the housing on opposite sides of the differential and in axial alignment, adjustable means for maintaining said shafts from longitudinal displacement, the ends of said housing having integral terminal yokes, wheel spindles having integral yokes pivotally connected with the yokes of the respective housing ends, said shafts at the yoke ends each having a portion of a universal joint secured thereto, a stub shaft associated with each wheel spindle, each having a companion portion of a universal joint pivotally associated with said first named universal joint portion, the pivotal axes of the universal connection intersecting on the turning axis of the spindle, wheel hubs on the said spindles, the stub shafts having a splined connection with the hubs, the arrangement providing for a free sliding of the stub shafts relative to the respective hubs, and means preventing movement of each hub in a direction longitudinally of the stub shaft.

2. The combination with a motor vehicle including a front driving axle, articulated driving wheels connected with said front driving axle, the said axle comprising a rigid axle housing, axle shafts journaled therein, adjustable means for holding the shafts against relative longitudinal and angular movement in the axle housing, a spindle pivotally connected with each end of said rigid axle housing, a stub shaft carried by each spindle and maintained in sliding driving connection with said articulated driving wheels, a universal joint section connected to one end of an axle shaft, a universal joint section connected to the adjacent end of the respective stub shaft, the two universal joint sections being pivotally connected together with the pivotal axes thereof intersecting at a point normally lying on the swinging axis of the respective spindle.

3. A motor vehicle construction having driving wheels and comprising the combination of a rotating driven shaft connected with each of the driving wheels and mounted for free sliding movement relative thereto, a power driven driving shaft for each wheel, a fixed housing for each driving shaft, adjustable means on each driving shaft for holding the same against angular and longitudinal movement relative to the fixed housing, a yoke on the end of the driving shaft, a pivot pin carried in the ends of the yoke, a yoke on the respective end of the driven shaft, a pivot pin carried thereby, the pivot pins intersecting to form a universal joint having a common turning point, yoke ends on the end of the fixed housing and a spindle provided with yoke ends fitting between the yoke ends of the fixed housing, the yoke ends of the fixed housing and spindle being pivotally connected to turn on a vertical axis passing through the point of intersection of the axes of the universal joint.

4. A motor vehicle construction having driving wheels and comprising the combination of a rotating driven shaft connected with each of the driving wheels and mounted for free sliding movement relative thereto, a power driven driving shaft for each wheel, a fixed housing for said driving shafts, adjustable means for holding each driving shaft against angular and longitudinal movement relative to the fixed housing, a connecting member comprising a single universal joint between each driven shaft and the end of the respective driving shaft, the fixed housing for each driving shaft being provided with yoke ends, a spindle about each driven shaft having yoke ends, the yoke ends of the spindle and housing being arranged for inter-engagement, and pivot pins connecting said yoke ends providing a vertical turning axis, the axis of the pivot pins passing through the point of intersection of the axes of the universal joint.

5. A motor vehicle having a power driven axle comprising a rigid axle housing, power driven axle shafts journaled in said housing, adjustable means for maintaining the axle shafts from possible longitudinal movement in the axle housing, articulated driving wheels carried by spindles pivotally secured to the ends of said housing, stub shafts having splined connections with the hubs of said driving wheels thereby permitting free sliding motion of the stub shafts relative to the wheels, and means comprising a universal joint connecting the stub shafts for rotation with the power driven axle shafts, the pivotal axes of the universal joint intersecting at a point normally lying on the swinging axis of the respective spindle, the arrangement permitting free swinging movement of the spindle relative to the axle housing while maintaining a driving connection between the said shafts and the said wheels.

CHARLES D. SMITH.